(12) United States Patent
Karlsson

(10) Patent No.: US 6,316,745 B1
(45) Date of Patent: Nov. 13, 2001

(54) ARRANGEMENT WITH TRANSFER OF MEASURED VALUES

(75) Inventor: Rolf Karlsson, Laxå (SE)

(73) Assignee: ESAB AB, Gothenburg (SE)

( * ) Notice: Subject to any disclaimer, the term of this patent is extended or adjusted under 35 U.S.C. 154(b) by 0 days.

(21) Appl. No.: 09/508,315

(22) PCT Filed: Sep. 10, 1998

(86) PCT No.: PCT/SE98/01614

§ 371 Date: Mar. 9, 2000

§ 102(e) Date: Mar. 9, 2000

(87) PCT Pub. No.: WO99/12691

PCT Pub. Date: Mar. 18, 1999

(30) Foreign Application Priority Data

Sep. 10, 1997 (SE) .................................................... 9703282

(51) Int. Cl.$^7$ .................................................... B23K 9/06
(52) U.S. Cl. .................................... 219/130.4; 219/130.31
(58) Field of Search ........................ 219/130.21, 130.31, 219/130.32, 130.33, 130.4, 137.9

(56) References Cited

U.S. PATENT DOCUMENTS 2,561,995 * 7/1951 Roberts ............................. 219/130.4
2,784,349 * 3/1957 Anderson .......................... 219/130.4

* cited by examiner

*Primary Examiner*—Clifford C. Shaw
(74) *Attorney, Agent, or Firm*—Nils H. Ljungman & Associates

(57) ABSTRACT

The invention relates to an arrangement for material transport and/or energy transport by means of electric arc. Measured values are transferred with suppression of disturbances from the HF device (2) without appreciable damping of the HF voltage to the electrode (14). A measurement winding (16) is arranged together with a power winding (8) in such a way that effective suppression of disturbances is achieved. Examples of areas of application are thermal spraying, cutting and welding, in particular mechanized TIG welding, but the invention is principally indicated in cases where a spark is established with HF voltage across a gap filled with a gas or a gas/liquid mixture and where at the same time some parameter has to be measured in connection with the spark gap.

20 Claims, 2 Drawing Sheets

U₁ 500V/div

U₂ 5 kV/div

U₃ 5 kV/div 2.5μs

ARRANGEMENT WITH TRANSFER OF MEASURED VALUES

TECHNICAL FIELD

The present invention relates to an arrangement for material transport and/or energy transport by means of electric arc. Measured values are transferred with suppression of disturbances from the HF device without appreciable damping of the HF voltage to the electrode.

BACKGROUND

Various types of equipment use high-frequency high voltage to establish an electric arc for transport of material and/or energy. The level of disturbance in such equipment is often extremely high. This to a very great extent makes it difficult to carry out measurements in the equipment and to control the said equipment. Examples of areas of application for such equipment are thermal spraying, cutting and welding. In this document, welding will be used as an illustrative example.

In arc welding it is often necessary to measure and to feed back the voltage across the arc to the control part and/or measurement part of the welding current source. In welding with consumable electrodes, the fed-back measured value is often used to regulate the welding process in order to obtain an even droplet transfer with minimum weld splatter. In welding with non-consumable electrodes, the aim of the feed-back is in most cases to prevent dipping of the electrode in the molten pool, which would lead both to a destroyed electrode tip and to inadmissible inclusions of electrode material in the weld deposit. A special case is mechanized TIG welding when joining pipes or welding pipes into end plates, where the arc length and thus the height of the welding electrode above the workpiece are regulated as a function of the arc voltage. This height control is used, for example, to bridge variable roundness of the pipes or to adapt the height in multiple pass welding, when the weld seam laid during the preceding pass is contacted. In welding both with consumable and non-consumable electrodes, the aim can also be to register welding data for the purpose of monitoring quality.

In order to create reliable arc ignitions when the quality and/or productivity requirements are high, a high-frequency device (HF device) is often used which superposes high-frequency high voltage on the open-circuit voltage fed from the current source to the welding electrode. An HF spark ionizes the protective gas between electrode and workpiece and the arc can be established. The HF device is then switched off normally, and the arc is maintained thereafter with ordinary welding voltage. When welding with alternating current, it may also happen that HF is not only used at the outset, but is also used in order to keep the arc burning at the zero passages of the welding voltage.

A transformer is often used to connect the HF voltage to the welding cable. A characteristic feature is that the secondary winding of the transformer is dimensioned to withstand the total welding current. This transformer transfer can be done for reasons relating to personal safety. When the HF device in question permits connection without transformer, there is often an inductor with or without core connected between current source and HF device in order to prevent the HF voltage from entering the power part of the current source.

On account of high welding currents and sometimes long welding cables, the voltage drop across the cables is considerable if the voltage measurement takes place at the welding current source connections. For this reason, the measurement advantageously takes place in direct proximity to the electrode, and a separate measurement line leads the voltage value back to the current source. Since the return line from workpiece to current source can often be dimensioned for minimum voltage drop, while the welding cable must be dimensioned smaller on account of requirements relating inter alia to ease of handling for the welder, or automatic welding torch manipulator, the measurement in these cases can take place relative to the return cable socket of the current source, and thus a single measurement line is sufficient.

As was mentioned in the introduction, a problem with the said HF voltage is that it causes considerable disturbance for the electronic components in the current source. Operating breakdowns and component malfunctions are the result, unless the electronics system is screened off with very great care.

It is known (as is shown diagrammatically in FIG. 1) to arrange a filter in the measurement line in order to prevent the HF voltage from reaching the control part of the current source.

A second problem at the high frequency is the difficulty involved in maintaining sufficient impedance with respect to the rest of the equipment so that the HF voltage is not damped en route from HF device to welding electrode.

In dimensioning the above filter, a compromise has to be reached between good damping of the HF voltage with respect to the control and/or measurement part, low damping of the HF voltage at the electrode, and low damping of the measured welding voltage.

A further problem is that the high HF voltage breaks down the insulation upon long-term exposure unless use is made of large insulating distances and high-quality insulation material.

Because of this latter problem, the above-mentioned filter must be made extremely robust. High-quality components, large insulating distances, requirements in respect of casting in order to avoid corona effects, etc., lead to large physical dimensions and high costs. In order to avoid capacitive damping of the HF voltage, the filter has to be placed near the electrode. The dimensions mean that the measurement line often has to be laid physically separate from the welding cable, which further adversely affects the HF voltage, as the damping via the capacitance to earth increases when these are laid on a floor, for example.

OBJECT OF THE INVENTION

The object of the invention is to make available an arrangement which affords a solution to the above problems without having the disadvantages inherent to the prior art.

According to the invention, this object is achieved by the fact that the filter in FIG. 1 is replaced by an extra winding on the existing transformer or inductor and that this winding, hereinafter called the measurement winding, on the control part side is decoupled with a capacitor according to FIG. 2 or FIG. 3. The measurement winding consists of a thin cable with good insulation, which is wound together with the winding which carries the welding current. The measurement winding must in principle have the same number of turns as this weld winding and must have the same direction of winding.

The principle is that equally high HF voltage is induced in the measurement winding as in the welding winding. The two windings are decoupled as shown in FIGS. 2 and 3 with capacitors at the end towards the control and/or measurement part or the power part, respectively, of the current source, so that the HF voltage is negligible there. Since the direction of winding is common, the potential difference between measurement line and welding line is low, and the lines can be coupled together at, for example, the same point in the welding head without the HF voltage between electrode and workpiece being damped to any great extent. Measurement line and welding cable can advantageously be laid in the same outer sheath, which provides a robust and flexible cabling.

The advantages are very clear. More flexible cabling is made possible. A much lower damping or the HF voltage compared to previous solutions means that, with unchanged frequency and voltage from the HF device, markedly improved ignition properties are achieved for the current source and thus shorter coupling times for the HF device, which in turn leads to a longer useful life for HF-exposed components and less emission of disruptive radiation. Alternatively, the reduced damping can be used to reduce frequency and/or voltage from the HF device and thereby to further reduce emission to surrounding equipment, something which is crucial as regards the possibility of using the HF device in environments which are sensitive to disturbance. In addition, the manufacturing costs are much lower than in the prior art.

DESCRIPTION OF PREFERRED EMBODIMENTS

Figure 1:
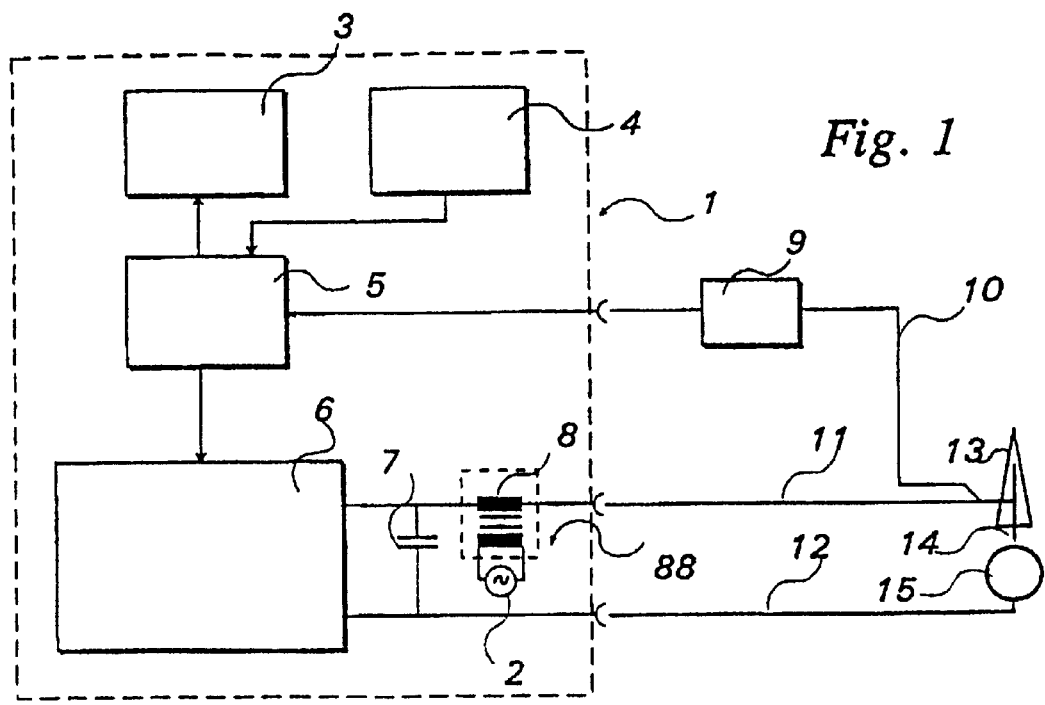
FIG. 1 is a diagrammatic representation of an example of an arrangement according to the prior art, with a filter in the measurement line from the tool.
Figure 2:
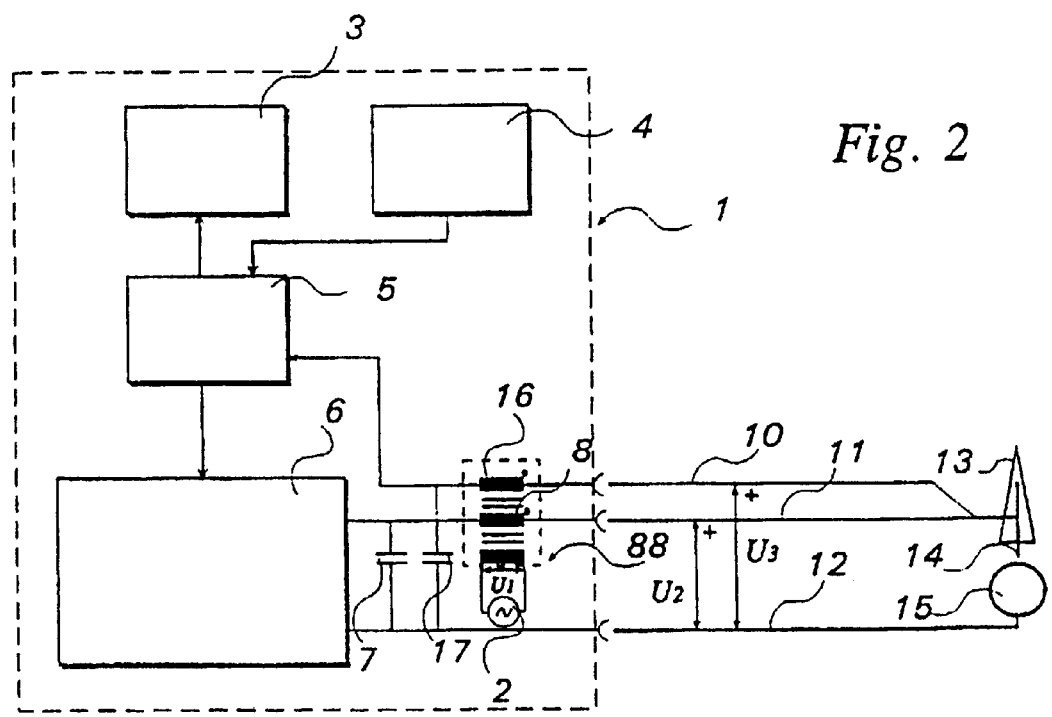
FIG. 2 shows corresponding coupling, but this time according to the invention, since the HF voltage is applied to the process cable via a transformer with two co-wound secondary windings—the power winding and the measurement winding.

Illustrative embodiments of the invention will now be discussed with reference to the drawings. Typical equipment for mechanized TIG welding, for example of pipe joints, will be taken to illustrate the invention. Such equipment comprises a current source 1, a welding cable 11, a welding torch 13 with electrode 14, and a return cable 12 from the workpiece 15. The current source comprises a power part 6, a control part 5, a manoeuvring unit 4, a motor drive 3 for positioning the welding head, on the one hand, along the seam, and, on the other hand, vertically and sometimes also laterally, an HF device 2, a transformer 88 for galvanic isolation and step-up transformation of the voltage from the HF device, and a capacitor 7 for HF decoupling.

In order to establish the arc, the HF device 2 is activated for a short time while the power part is emitting open-circuit voltage to the welding torch. When the protective gas which is being fed through the welding torch has been ionized by HF spark between electrode and workpiece, current begins to flow from the power unit 6 through the power winding 8; 98, welding cable 11, electrode 14, arc, workpiece 15 and return cable 12. The voltage across the arc is now of the order of 8–15 V. Depending on the magnitude of the current, there is a voltage drop of 0.5–3 V across the welding cable and typically of 0.1–0.8 V across the return cable. Since the arc voltage is dependent on the arc length, this is used as a control parameter when the control part 5 is controlling the motor drive 3 for vertical holding of the torch head. A typical feature of TIG welding is that the current is pulsed, and thus the voltage drop varies particularly across the welding cable 11. For this reason, among others, it is very important to measure the arc voltage near the electrode 14. A separate measurement line 10 is therefore arranged running from torch 13 to control part 5. The problem of protecting the control part from the HF voltage has previously been solved using a filter 9. The difficulties in constructing the latter so that it damps the HF voltage sufficiently in relation to the control part without at the same time loading and thus damping the HF voltage at the electrode, and the problems of withstanding the high voltage over the long term, have already been touched upon. A far more elegant, more efficient and more economical solution is to introduce a measurement winding 16 which, upon manufacture of the HF transformer 88, is co-wound with the secondary coil 8 of the latter. The same voltage is induced at 16 and 8, and in this way the HF voltage at the electrode is not loaded by the measurement line 10. Capacitive loading between measurement cable and earth can now also be avoided by means of the measurement cable being laid in immediate proximity to the welding cable 11, which of course has the same potential as the measurement cable, except for a few volts of voltage drop on account of the welding current. In this way, the extra load which the measurement cable represented for the HF voltage at the welding torch has been largely eliminated. Capacitor 17 decouples any residual voltage from the HF voltage at the control part input.

Figure 3:
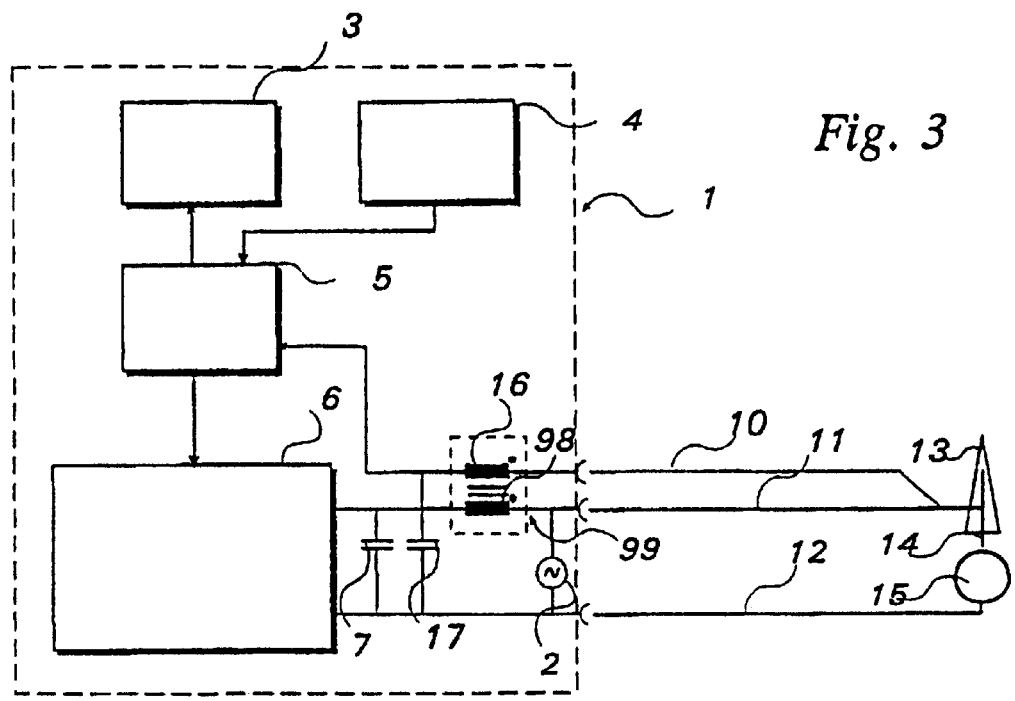
FIG. 3 shows an alternative embodiment with inductor in the process cable and with co-wound measurement winding.

A second embodiment is shown in FIG. 3, where the HF device itself generates sufficient voltage and is galvanically isolated from the mains voltage. No transformer is needed here, but an inductor 99 is required for protecting the power part 6. A measurement winding 16 is co-wound in the same way with the inductor winding 98.

Figure 4:
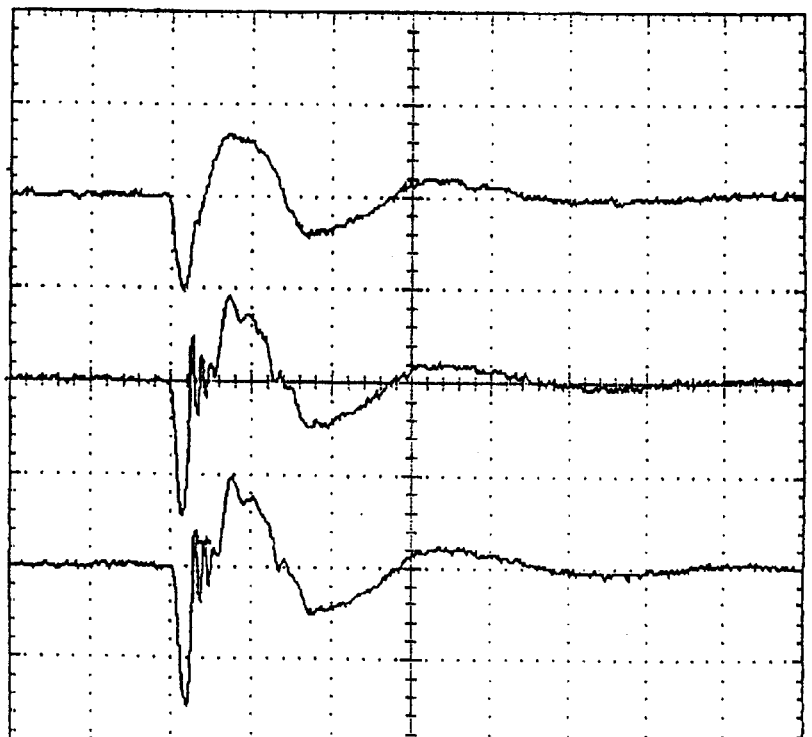
FIG. 4 shows examples of curve shapes for the HF voltage. It will be seen that the voltage is about 8 kV and the frequency 100 kHz–5 Mhz.

FIG. 4 shows examples of voltage/time diagrams for the HF voltage. Showers of the pulses shown occur at a repetition frequency of 50–600 Hz as long as the HF device is activated.

Many different types of equipment have in common the fact that they use HF voltage to create a spark across a gap filled with a gas or a gas/liquid mixture. In all cases where a parameter such as spark time or arc voltage is to be measured in direct connection with this spark gap, the invention provides an elegant way of connecting a measurement cable and at the same time of protecting the measuring equipment from damaging high voltage, without adversely affecting the spark.

What is claimed is:

1. A welding tool for transfer of at least one of material and energy, said welding tool comprising:
   a welding electrode;
   a receiver being configured and disposed to receive an electric arc from said welding electrode;
   a power part;
   a power cable;
   said power part being configured and disposed to supply energy to said welding electrode through said power cable;
   a high frequency device being disposed between said power part and said welding electrode;

said high frequency device being configured to generate high-frequency high voltage;

a control device being configured to measure and control said electric arc;

a measurement line being configured and disposed to connect said power cable to said control device;

a first component having low impedance with respect to high-frequency high voltage;

an inductive element being disposed between said power cable and said power part;

said inductive element comprising a power winding;

a disturbance-suppressing element being disposed between said inductive element and said measurement line;

said disturbance-suppressing element comprising a measurement winding;

said measurement winding being configured such that a voltage induced therein and in said power winding has a polarity in relation to said welding electrode to minimize disturbances.

2. The welding tool according to claim 1, wherein said voltage induced in said measurement winding and said power winding has the same polarity in relation to said welding electrode.

3. The welding tool according to claim 2, wherein:
said disturbance-suppressing element comprises a damping component having low impedance with respect to high-frequency high voltage; and
said damping component is configured and disposed to damp residual high frequency high voltage generated by said high frequency device.

4. The welding tool according to claim 3, wherein said power winding and said measurement winding have essentially the same number of turns.

5. The welding tool according to claim 4, wherein:
said measurement line and said power cable are laid in immediate proximity to each other; and
said power winding and said measurement winding are co-wound.

6. The welding tool according to claim 5, wherein:
said high frequency device is configured to be coupled-in intermittently to permit transfer of showers of electric pulses to said process cable; and
said showers of pulses have a voltage of between 1 and 30 kV and frequencies of between 0.1 and 10 MHz.

7. The welding tool according to claim 6, wherein:
said measurement line is configured to carry a signal; and
said signal in the measurement line has a frequency of less than 10 kHz.

8. The welding tool according to claim 7, wherein:
said material transported by the arc is metallic; and
said power part comprises a current source for direct current.

9. A welding tool for transfer of at least one of material and energy, said welding tool comprising:
a welding head;
a receiver being configured and disposed to receive an electric arc from said welding head;
a power part;
a power cable;
said power part being configured and disposed to supply energy to said welding head through said power cable;
a high frequency device being disposed between said power part and said welding head;

said high frequency device being configured to generate high-frequency high voltage;

a control device being configured to measure and control said electric arc;

a measurement line being configured and disposed to connect said power cable to said control device;

a first component having low impedance with respect to high-frequency high voltage;

an inductive element being disposed between said power cable and said power part;

said inductive element comprising a power winding;

a disturbance-suppressing element being disposed between said inductive element and said measurement line;

said disturbance-suppressing element comprising a measurement winding;

said measurement winding being configured such that a voltage induced therein and in said power winding has a polarity in relation to said welding head such as to minimize loading of high frequency high voltage at said welding head.

10. The welding tool according to claim 9, wherein said voltage induced in said measurement winding and said power winding has the same polarity in relation to said welding head.

11. The welding tool according to claim 10, wherein:
said disturbance-suppressing element comprises a damping component having low impedance with respect to high-frequency high voltage; and
said damping component is configured and disposed to damp residual high frequency high voltage generated by said high frequency device.

12. The welding tool according to claim 11, wherein said power winding and said measurement winding have essentially the same number of turns and are co-wound.

13. The welding tool according to claim 12, wherein said measurement line and said power cable are laid in immediate proximity to each other.

14. The welding tool according to claim 13, wherein:
said high frequency device is configured to be coupled-in intermittently to permit transfer of showers of pulses to said process cable; and
said showers of pulses have a voltage of between 1 and 30 kV and frequencies of between 0.1 and 10 MHz.

15. The welding tool according to claim 14, wherein:
said measurement line is configured to carry a signal;
said signal in the measurement line has a frequency of less than 10 kHz;
said material transported by the arc is metallic; and
said power part comprises a current source for direct current.

16. An arrangement for material transfer and/or energy transfer by means of an electric arc between a tool and a receiver, the arrangement comprising a power part, a control and/or measurement part, a high frequency device which generates high-frequency high voltage, a first component with low impedance with respect to high-frequency high voltage, a process cable for energy transport to the tool, an inductive element arranged between the process cable and the power part with power winding, a measurement line and, arranged between the latter and the control and/or measurement part, a disturbance-suppressing element, wherein the disturbance-suppressing element comprises a measurement winding arranged so that the voltage induced therein and in the power winding has the same polarity in relation to the tool.

17. The arrangement according to claim 16, wherein the disturbance-suppressing element also comprises a second component with low impedance with respect to high-frequency high voltage, which component damps any residual voltage from the high frequency voltage, and the power winding and the measurement winding have essentially the same number of turns.

18. The arrangement according to claim 17, wherein the measurement line and process cable are laid in immediate proximity to each other, and the power winding and measurement winding are co-wound.

19. The arrangement according to claim 18, wherein the high frequency device is coupled-in intermittently and during this transfers to the process cable showers of pulses with voltage between 1 and 30 kV and frequencies of between 0.1 and 10 MHz, and the signal in the measurement line has a frequency of less than 10 kHz.

20. The arrangement according to claim 19 wherein the material transported by the arc is metallic, and the receiver is made of metal, and the power part constitutes a current source for direct current.

* * * * *